Patented May 11, 1948

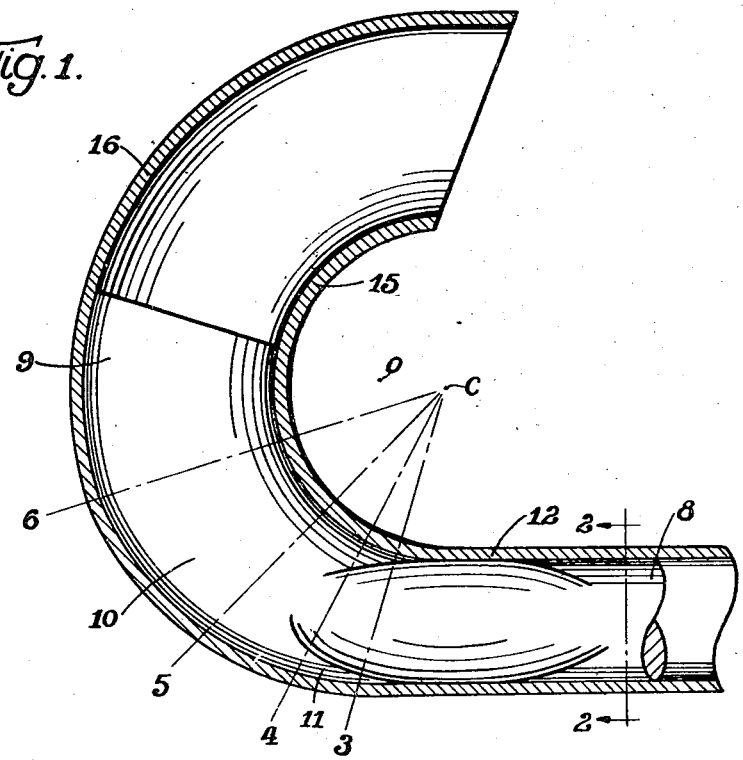
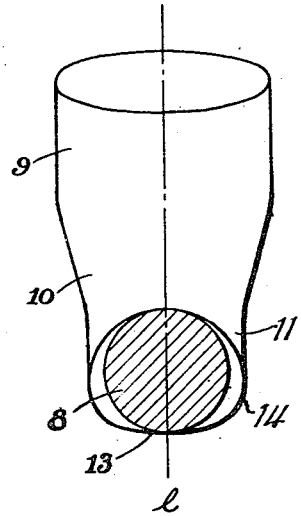
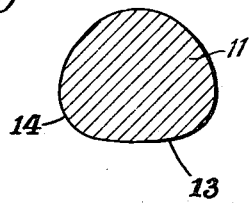
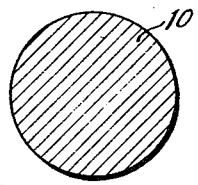
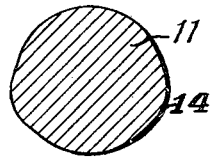
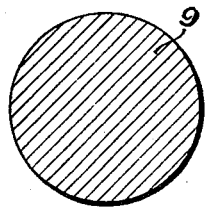

2,441,299

UNITED STATES PATENT OFFICE 2,441,299

MANDREL FOR AND METHOD OF MAKING PIPE BENDS

James Hall Taylor, Oak Park, Ill.

Application January 15, 1945, Serial No. 572,775

7 Claims. (Cl. 153—32)

This invention relates to the manufacture of pipe fittings, and has to do with a new mandrel and a new method for the forming of pipe bends, such as elbows and U-turns.

It is well known to form straight pipe of given diameter into pipe bends and the like by subjecting the pipe to the action of a curved enlarging mandrel (such as that of my Patent No. 2,181,384, for example) over which the pipe is bent lengthwise, by moving the mandrel lengthwise through the pipe, moving the pipe lengthwise over the mandrel, or by imparting relative lengthwise movement to both the pipe and the mandrel. In the following description I shall refer to the pipe as being moved lengthwise over the mandrel, it being understood, however, that such reference, both in the description and in the appended claims, is to be construed as including movement of the mandrel lengthwise through the pipe while the latter remains stationary, as well as lengthwise movement of both the pipe and the mandrel in opposite directions.

In pipe bends the inner side of the curve of the bend, in the use thereof, is subjected to materially greater stresses than the outer side of the bend. It is desirable, therefore, that the inner side of the bend be of appreciably greater wall thickness than the outer side of the bend. My invention is directed to the provision of a mandrel whereby a straight pipe may readily be formed into a pipe bend having the wall at the inner side thereof of greater thickness than the wall at the outer side. I attain that result by the provision of a mandrel having a curved portion increasing outwardly in cross sectional area and of proper form to shape a cylindrical pipe moving thereover to approximately segmento-circular cross section, with the chord at the outer side of the bend, this curved portion of the mandrel merging at its outer end into a second and outer portion of circular cross section and uniform diameter curved about a center; whereby the pipe is expanded and shaped to segmento-circular cross section and is then shaped to a circular cross section of increased diameter and is bent lengthwise to desired curvature about the center of curvature of the outer portion of the mandrel. The use of such a mandrel gives rise to a novel method of making pipe bends whereby a straight cylindrical pipe is first shaped to approximately segmento-circular cross section and is then expanded radially and bent lengthwise in a curve about a center with the chordal area of the segmento-circular cross sectional shape of the pipe at the outer side of the bend. In that manner the wall at the inner side of the resultant bend is rendered thicker than that at the outer side. Further objects and advantages of my invention will appear from the detail description.

In the drawings:

Figure 1 is a side view of a mandrel embodying my invention, with a pipe, shown in section, being forced over it;

Figure 2 is a sectional view of the mandrel taken substantially on line 2—2 of Figure 1; and Figures 3, 4, 5, and 6 are views showing the cross sectional areas and shapes of the mandrel taken substantially in the planes c—3, c—4, c—5 and c—6, respectively, indicated in Figure 1.

The mandrel comprises an inner cylindrical portion 8, an outer curved portion 9 and an intermediate portion comprising lengthwise segments 10 and 11. The pipe or tube 12, originally straight lengthwise and of circular cross section, fits over portion 8 and is pushed therealong and over the mandrel or, as above noted, the mandrel is moved in the pipe, or the mandrel and the pipe are moved lengthwise in opposite directions. For purposes of description, it will be assumed that the pipe is moved lengthwise over the mandrel.

Outer portion 9 of the mandrel is curved concentrically about the center $c$, about which center the inner side of the curve of intermediate portion 10—11 is preferably, though not necessarily, also subscribed, the outer side of the curve of intermediate portion 10—11 being subscribed about the center $o$ eccentric to center $c$ and blending at its outer end into the curve at the outer side of the outer portion 9. The curves at the inner and outer sides of the intermediate portion 10—11 are tangent to and blend into the inner portion of segment 11 at the inner ends of such curves. The curvature of the outer portion 9 of the mandrel corresponds to the desired curve of the bend to be formed, as will be understood.

The inner segment 11 of the intermediate portion 10—11 of the mandrel is of generally triangular or segmento-circular cross section in any transverse plane thereof, with the base or chord of such segment at the outer side thereof presenting a flattened surface 13 disposed normal to the common plane of the lengthwise axes of the inner portion 8 and the outer curved portion 9 of the mandrel, the latter plane being indicated by the line $k$—$l$ in Figure 2. The flattened surface 13 is of maximum width adjacent the outer end of segment 11 of the mandrel and decreases in width toward each end of segment 11, as will be clear from Figures 3, 4 and 5, becoming zero at each end of segment 11, which is of circular cross section at its inner and outer ends, as shown in Figures 2 and 5, respectively, where it merges smoothly into the inner straight portion 8 and the segment 10, respectively, the latter being of circular cross section throughout its length, increasing in diameter outward and merging smoothly at its outer end into outer portion 9.

It will be seen that the intermediate portion 10—11 of the mandrel increases in cross sectional area outward toward the outer portion 9, with the flattened surface 13 diminishing in width from adjacent its outer end toward each end, the segment 11 presenting, in effect, lateral projections connected to the flat surface 13 by rounded corners 14, which projections diminish in lateral extent outward toward and merge into the segment 10. In the travel of the pipe 12 over the mandrel it is deformed by the segment 11 from its original circular cross section to a substantially triangular or segmento-circular cross section, and is expanded radially by internal pressure, the flat base or chordal side of the reformed pipe, at the outer side of segment 11 of the mandrel, becoming of maximum width adjacent the outer end of that segment. In the continued movement of the pipe over the mandrel, the flat or chordal side of the pipe is stretched about the outwardly rounding outer curve of segment 11 and about segment 10 until the pipe has been expanded and reformed to circular cross section, at which time it passes onto the outer portion 9 of the mandrel so as to be bent lengthwise to the desired curvature, as shown in Figure 1.

As will be clear from Figure 3, the maximum width of the mandrel, at the inner end of segment 11 thereof, is at the upper ends of the rounded corners 14 connected, at their lower ends, by the flattened surface 13 of considerable width. The pipe has high frictional contact with the mandrel at the areas of the corners 14, from the upper to the lower ends thereof. That, in conjunction with the flat area of the pipe underlying flattened surface 13, presents high resistance to flow of metal of the pipe upward about corners 14. On the other hand, the portion of the mandrel above the upper ends of corners 14, in Figure 3, is of smoothly rounded contour, so that the pipe can readily stretch about that area. The pipe is, in effect, formed into a lower substantially flat portion or chordal area segregated by the shoulders 14 from an upper arcuate portion, as it passes forward onto segment 11 of the mandrel. In the continued advancement of the pipe over the mandrel, the upper portion thereof, at the inner or shorter side of the bend being formed, is upset with resultant displacement and redistribution of metal at that side. That causes thickening of the wall at the inner side of the bend and flow of a portion of the displaced metal from the inner side of the bend circumferentially about the mandrel toward the outer side of the bend. Simultaneously with this circumferential flow of metal toward the outer side of the bend, the flat or chordal area of the pipe is stretched about the outer side of the mandrel so as to be shaped conformably thereto. Due to the circumferential flow of the displaced metal toward the outer side of the bend, the wall at that side is not thinned to an appreciable or objectionable extent and remains of the same thickness as that of the original pipe, or substantially so, as will be clear from Figure 1. The greatest displacement and redistribution of metal occurs in the outer portion of the bend being formed, at the segments or areas thereof connecting the formerly flattened or chordal area of the pipe to the thickened inner side of the bend. The pipe is thus progressively reformed from circular cross section to a generally triangular or segmento-circular cross section and expanded radially, being thereafter reformed to circular cross section and further expanded radially and then bent lengthwise to the desired curvature, in such manner that the greater displacement and redistribution of metal occurs at the outer side of the curve. The amount of metal displaced and redistributed at the inner side of the curve of the mandrel, in the passage of the pipe thereover, is less than that at the outer side of the curve, with the result that the wall at the inner side of the formed bend, which wall is numbered 15 in Figure 1, is of greater thickness, than the wall 16 at the outer side of the bend. As the pipe leaves the mandrel, elbows and U-turns are cut therefrom as desired, the resultant bends being characterized by having a wall at the inner side of the curve of greater thickness than the wall at the outer side thereof.

I claim:

1. A mandrel for making pipe bends of circular cross section, comprising a body having an inner portion of less diameter than the interior diameter of the desired bend, a curved outer portion of the same diameter as the interior diameter of the desired bend, and an intermediate curved portion connecting said inner and outer portions, said intermediate portion for at least a substantial portion of its length being of generally triangular cross section with a flattened surface at the outer side thereof disposed in general substantially normal to the common plane of the lengthwise axes of said inner and outer portions, said intermediate portion increasing in cross sectional area outward toward and merging into said outer portion.

2. A mandrel for making pipe bends of circular cross section, comprising a body having a cylindrical inner portion of less diameter than the interior diameter of the desired bend, a curved outer portion of the same diameter as the interior diameter of the desired bend, and an intermediate curved portion connecting said inner and outer portions, said intermediate portion having a lengthwise segment thereof of generally triangular cross section with a flattened surface at the outer side of said segment disposed, in any transverse plane of said segment, in general substantially normal to the common plane of the lengthwise axes of said inner and outer portions, said flattened surface decreasing in width outward and merging into said intermediate portion and the latter increasing in cross sectional area outward toward and merging into said outer portion.

3. A mandrel for making pipe bends of circular cross section, comprising a body having a cylindrical inner portion of less diameter than the interior diameter of the desired bend, a curved outer portion of the same diameter as the interior diameter of the desired bend, and an intermediate curved portion connecting said inner and outer portions, said intermediate portion comprising an outer lengthwise segment and an inner lengthwise segment of generally triangular cross section with a flat surface at the outer side thereof disposed, in any transverse plane of said inner segment, in general substantially normal to the common plane of the lengthwise axes of said inner and outer portions, said flattened surface being of maximum width adjacent the outer end of said inner segment, the latter increasing in cross sectional area outward toward and merging into said outer segment and decreasing in cross sectional area inward toward and merging into said inner portion, said flattened surface decreasing in width outward toward said outer segment and inward toward said inner portion and merging at its outer and inner ends into said outer segment and inner portion respectively, said outer segment being of circular cross section increasing in diameter outward and merging into said outer portion.

4. The method of making pipe bends of circular cross section, which comprises moving a straight cylindrical pipe lengthwise, and during such movement progressively forming by internal pressure to a cross section of approximately triangular shape having one side substantially flat and the remainder curved and then expending the pipe radially to circular section and bending it lengthwise about a center with the flat side of said triangular shape at the outer side of the bend.

5. The method of making pipe bends of circular cross section having the wall at the inner side of the bend of greater thickness than the wall at the outer side, which comprises moving a straight cylindrical pipe lengthwise, and during such movement progressively forming it to a cross section of approximately triangular shape having a substantially flat side at the outer side of the desired bend and then expending the pipe radially to circular section and bending it lengthwise about a center.

6. The method of making pipe bends of circular cross section having the wall at the inner side of the bend of greater thickness than the wall at the outer side, which comprises passing a straight cylindrical pipe lengthwise first over a curved forming element of increasing cross sectional area and approximately triangular cross section having a substantially flat side at the outer side of the curve and then over a forming element of circular cross section curved about a center, whereby said pipe is first expanded radially and shaped to approximately triangular cross section and is then expanded radially to circular cross section and bent lengthwise about a center, in its passage over the mandrel.

7. The method of making pipe bends of circular cross section having the wall at the inner side of the bend of greater thickness than the wall at the outer side, which comprises forcing a straight cylindrical pipe over a curved mandrel of increasing cross sectional area in the direction of movement of the pipe and having a first portion of approximately triangular cross section having a substantially flat side at the outer side of the curve of the mandrel and a second portion of circular cross section, whereby said pipe is first expanded radially and shaped to approximately triangular cross section and is then expanded radially to circular cross section and is bent lengthwise about a center, in its passage over the mandrel.

JAMES HALL TAYLOR.

REFERENCES CITED

The following references are of record in the file of this patent:

UNITED STATES PATENTS

| Number | Name | Date |
|---|---|---|
| 1,951,334 | Bohling | Mar. 20, 1934 |
| 2,105,075 | Fritsch | Jan. 11, 1938 |
| 2,181,384 | Taylor | Nov. 28, 1939 |

FOREIGN PATENTS

| Number | Country | Date |
|---|---|---|
| 570,251 | Germany | Feb. 13, 1933 |